United States Patent
Shah et al.

(10) Patent No.: US 11,727,117 B2
(45) Date of Patent: Aug. 15, 2023

(54) VULNERABILITY ANALYZER FOR APPLICATION DEPENDENCIES IN DEVELOPMENT PIPELINES

(71) Applicant: Red Hat, Inc., Raleigh, NC (US)

(72) Inventors: Aagam Shah, Bengaluru (IN);
Samuzzal Choudhury, Bengaluru (IN);
Mitesh Patel, Bengaluru (IN)

(73) Assignee: Red Hat, Inc., Raleigh, NC (US)

( * ) Notice: Subject to any disclaimer, the term of this patent is extended or adjusted under 35 U.S.C. 154(b) by 894 days.

(21) Appl. No.: 16/226,126

(22) Filed: Dec. 19, 2018

(65) Prior Publication Data
US 2020/0202006 A1    Jun. 25, 2020

(51) Int. Cl.
*G06F 21/57*    (2013.01)
*G06F 8/77*    (2018.01)
*G06F 8/71*    (2018.01)
*G06F 8/41*    (2018.01)

(52) U.S. Cl.
CPC ............ *G06F 21/577* (2013.01); *G06F 8/433* (2013.01); *G06F 8/71* (2013.01); *G06F 8/77* (2013.01); *G06F 2221/033* (2013.01)

(58) Field of Classification Search
CPC .......... G06F 21/577; G06F 8/433; G06F 8/71; G06F 8/77; G06F 2221/033
See application file for complete search history.

(56) References Cited

U.S. PATENT DOCUMENTS

| | | | |
|---|---|---|---|
| 8,677,315 B1* | 3/2014 | Anderson | G06F 9/4411 717/110 |
| 10,303,586 B1* | 5/2019 | Falko | G06F 11/368 |
| 10,417,119 B2* | 9/2019 | Francis | G06F 11/368 |
| 10,613,970 B1* | 4/2020 | Jammula | G06F 8/77 |
| 11,044,139 B1* | 6/2021 | Farber | G06F 9/4484 |
| 2008/0148247 A1* | 6/2008 | Galler | G06F 11/3684 717/154 |
| 2013/0174117 A1* | 7/2013 | Watters | G06F 8/71 717/106 |
| 2014/0123285 A1* | 5/2014 | Ludwig | G06F 21/554 726/23 |
| 2014/0380279 A1* | 12/2014 | Bartley | G06F 11/3676 717/124 |

(Continued)

OTHER PUBLICATIONS

Kosaka, Glen; NeuVector Extends Red Hat OpenShift Availability with Role-Based Access Controls for Automated Run-time Container Security, May 8, 2018; VP Marketing & Product Management, NeuVector, Inc., https://neuvector.com/container-security/openshift-automated-security/.

(Continued)

*Primary Examiner* — Douglas M Slachta
(74) *Attorney, Agent, or Firm* — Haynes and Boone, LLP (57) ABSTRACT

Systems, methods, and machine-readable instructions stored on machine-readable media are disclosed for analyzing an image for vulnerabilities. A repository is provided to a development stage of a development pipeline. An image associated with the repository is built. A list of dependencies and versions of the dependencies used in the building of the image is identified. The image is analyzed for vulnerabilities based on the identified list of dependences and the versions of the dependencies used in the building of the image. A report is provided based on the analysis.

19 Claims, 4 Drawing Sheets

(56) References Cited

U.S. PATENT DOCUMENTS

| | | | |
|---|---|---|---|
| 2016/0147642 A1* | 5/2016 | Haeuptle | G06F 11/3684 |
| | | | 717/124 |
| 2016/0188885 A1* | 6/2016 | Lee | G06F 21/577 |
| | | | 726/25 |
| 2016/0274994 A1* | 9/2016 | Nikam | G06F 11/3664 |
| 2017/0169229 A1* | 6/2017 | Brucker | G06F 21/566 |
| 2017/0187540 A1 | 6/2017 | Hanner et al. | |
| 2017/0213037 A1* | 7/2017 | Toledano | H04L 63/06 |
| 2017/0262361 A1* | 9/2017 | Francis | G06F 11/3672 |
| 2018/0024911 A1* | 1/2018 | Kruszewski | G06F 11/3664 |
| | | | 717/125 |
| 2018/0052762 A1 | 2/2018 | Vyas et al. | |
| 2018/0060066 A1 | 3/2018 | Rihani et al. | |
| 2018/0275989 A1* | 9/2018 | Kakkad | G06F 11/3409 |
| 2018/0285572 A1 | 10/2018 | Hanner et al. | |
| 2019/0294535 A1* | 9/2019 | Allen | G06F 11/3688 |
| 2019/0317754 A1* | 10/2019 | Mosquera | G06Q 10/06316 |
| 2020/0042628 A1* | 2/2020 | Foo | G06F 16/2264 |
| 2020/0073781 A1* | 3/2020 | Falko | G06F 11/366 |

OTHER PUBLICATIONS

Tenable Network Security, Inc., Tenable.io Container Security, Oct. 25, 2018; https://docs.tenable.com/cloud/containersecurity/content/pdf/Tenable.ioContainerSecurity.pdf.

Aqua Security Software Ltd., Automate DevSecOps: Security and Speed Without Compromise, 2018; https://www.aquasec.com/use-cases/devsecops-automation/.

Quals, Inc., "Container Security", 2018; https://www.qualys.com/apps/container-security/.

* cited by examiner

VULNERABILITY ANALYZER FOR APPLICATION DEPENDENCIES IN DEVELOPMENT PIPELINES

FIELD OF DISCLOSURE

The present disclosure generally relates to data processing, and more particularly to version control.

BACKGROUND

Containers are lightweight mechanisms for isolating running processes so that they are limited to interacting only with their designated resources. Many application instances can be running in containers on a single host without visibility into one anothers' processes, files, network, and so on. Typically, each container provides a single service (often called a "micro-service"), such as a web server or a database, though containers can be used for arbitrary workloads.

Containers may be used to ensure consistency across multiple development environments. For example, software applications may be packaged into container images that include collections of objects and metadata. An image is a binary that includes all of the dependencies or requirements for running a container, as well as metadata describing its needs and capabilities. Images, which may be read-only, may contain files such as packages, scripts, libraries, settings, etc. These files allow the image to be run as a standalone application in a container.

A software development pipeline may include several stages, such as planning, analysis, design, development, implementation, testing, and maintenance.

SUMMARY

A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system including: a non-transitory memory, and one or more hardware processors coupled to the non-transitory memory to execute instructions from the non-transitory memory to perform operations including: providing a repository to a development stage of a development pipeline; building an image associated with the repository; identifying a list of dependencies and versions of dependencies used in the building of the image; analyzing the image for vulnerabilities based on the identified list of dependencies and the versions of the dependencies used in the building of the image; and providing a report based on the analysis. Other examples of this aspect include corresponding computer systems, apparatus, and computer programs recorded on one or more computer storage devices, each configured to perform the actions of the methods.

One general aspect includes a method including: providing a repository to a development stage of a development pipeline; building an image associated with the repository; identifying a list of dependencies and versions of dependencies used in the building of the image; analyzing the image for vulnerabilities based on the identified list of dependencies and the versions of the dependencies used in the building of the image; and providing a report based on the analysis. Other examples of this aspect include corresponding computer systems, apparatus, and computer programs recorded on one or more computer storage devices, each configured to perform the actions of the methods.

One general aspect includes a non-transitory machine-readable medium having stored thereon machine-readable instructions executable to cause at least one machine to perform operations including: providing a repository to a development stage of a development pipeline; building an image associated with the repository; identifying a list of dependencies and versions of dependencies used in the building of the image; analyzing the image for vulnerabilities based on the identified list of dependencies and the versions of the dependencies used in the building of the image; and providing a report based on the analysis. Other examples of this aspect include corresponding computer systems, apparatus, and computer programs recorded on one or more computer storage devices, each configured to perform the actions of the methods.

DETAILED DESCRIPTION

Today, nearly all organizations use containers. In this modern age of software development, security is a critical part of the development lifecycle. Unfortunately, many software developers are not sufficiently aware of application level security vulnerabilities as they are developing their applications, and may unwittingly build such vulnerabilities into the application during a build stage. Left undetected, these built-in vulnerabilities may then make their way into the production version of the application and threaten users of the application and the organization as a whole.

Accordingly, various examples described herein provide techniques to help developers detect and remove such vulnerabilities before they can be exploited by nefarious actors. As a high-level overview, the techniques include obtaining a list of dependencies including the versions of the dependencies used in building an image (such as a container image). The list is run through an analytics platform which queries a database where vulnerability information of application dependencies is stored. A report is then generated, which allows the developer to make an informed decision as to whether to continue building the image using the original dependencies, or whether to use other, safer dependencies. In some examples, such safer dependencies are recommended by the analytics platform. In some examples, a continuous integration/continuous delivery/deployment (CI/CD) pipeline is leveraged to automatically build and update images, while ensuring that only dependencies that have been verified as safe are used. Additionally, in some examples, only dependencies which have been successfully deployed in production are used.

In more detail, a user may register or provide a repository to a software development platform, such as RED HAT OPENSHIFT available from Red Hat, Inc., of Raleigh, N.C. The user may then create a CI/CD pipeline, for example, using JENKINS available from https://jenkins.io, to handle the building and deployment of the image (which may be comprised of one or more packages). The CI part of the CI/CD pipeline may automatically push code to the repository, perform static analysis, pre-deployment testing, packaging and deployment to the test environment, post-deployment testing, etc. Additionally, in some examples, as part of CI, a list of direct and transitive application dependencies used in the installation of the packages is obtained whenever a build of the image is triggered.

The continuous delivery part of the of CI/CD pipeline may automate the release of production-ready code to the repository, while continuous deployment may automate releasing an application into production. In some examples, there is no manual gate at the stage of the pipeline before production. Thus, continuous deployment may rely heavily on well-designed test automation. This means that a developer's change to an application could go live within minutes of its writing, assuming that the change passes automated testing. As such, it is imperative that dependencies neither break an application nor include security vulnerabilities, lest potentially millions of users be left stranded with a broken application, or worse, become sitting ducks for cyberattacks.

To bolster the integrity of dependencies, in some examples, a dependency list is obtained during a build stage of an image. For example, dependencies may be obtained from an install command used to build a package associated with an image. In some examples, the install command may be npm install or mvn install. Typically, the install commands are unique to the package manager or platform used. More generally, however, the install command may be any command which specifies the dependencies to be used in building a package, and in some examples, may also contain arguments that specify versions of the dependencies to be used in the building of the package. In such cases, since the dependencies have already been directly specified in the arguments provided with the install command, there is no need to parse a manifest file, lock file, shrinkwrap file, etc., to identify the versions of the dependencies to be used for the installation of the package. The advantages of obtaining versions directly from the build itself is reliability, since doing so eliminates human error associated with the manual updating of a manifest or lock file, and traceability to source, which allows developers to see exactly which file paths and repositories the dependencies were sourced from.

Sometimes, the specified arguments may not particularly identify the versions of dependencies to be used in the build, such as where version ranges are used (e.g., hyphen ranges, x-ranges, tilde ranges, caret ranges, etc.), or such as where arguments are provided to use the latest version. In such cases, the version of the dependency that is then actually retrieved from the repository and used in the build is captured. In some other cases, certain required dependencies may not be included in a manifest file. Thus, a CI/CD pipeline may be leveraged to install the missing dependencies and to capture the versions of the installed dependencies. For example, a user may update a pipeline definition file, such as a JENKINS file, with the required dependencies including their version numbers. Then, the CI/CD pipeline may be used to automate the processes of installing the new dependencies, code testing, and deploying the application to production.

In other words, regardless of whether arguments to get specific versions of dependencies are provided or not, the disclosed techniques advantageously leverage the CI/CD pipeline to resolve exact versions of the dependencies and generate dependency trees of the actual dependencies used in the build, without having to rely on a lock or manifest file. Should code testing reveal dependency-related conflicts, the CI/CD pipeline may also be leveraged to build and test different versions of dependencies to resolve the conflict. In some examples, versions of dependencies that are already in the production stage may be preferentially used for building and testing before non-production versions. If more than one version of the same dependency is in the production stage, the CI/CD pipeline may build out and test different combinations and permutations of the plurality of versions and the plurality of dependencies to find one or more working and vulnerability-free sets of dependencies.

As described earlier, the dependencies are analyzed for vulnerabilities by comparing the dependencies with a database storing vulnerability information. In some examples, the database may be a graph database, which uses nodes and relationships to capture information. For example, dependencies may be organized as nodes, with each node containing properties, such as version number, that describe the node. Additionally, the relationships between the nodes may convey information such as the type of dependency, the number of dependencies in a family, and other relational information. Thus, using a graph database allows dependency vulnerabilities to be analyzed based on properties of the dependencies themselves, such as version numbers. In addition, dependency vulnerabilities may also be analyzed based on the relationships between the dependencies. In some examples, a class of related dependencies may be known to contain vulnerabilities or exploits. In other examples, dependencies related to one another through a particular dependency path may likewise be compromised. To alert a developer of vulnerabilities such as the ones described as well as any other detected vulnerabilities based on the analysis, a report may be generated, an alarm may be sounded, a warning message may be displayed, etc. In some examples, the report may include the node properties and relationship information from the graph database, such as identifiers, version numbers, related dependencies, etc.

Thus, by leveraging CI/CD, the techniques disclose a robust but automated process of installing, testing, analyzing, and promoting to production dependencies that not only do not break an application, but are also verified to be free of security vulnerabilities. Such tested and verified dependencies that make it into production may be stored as "approved" dependencies, and future versions of the application may be built using these approved dependencies rather than the latest dependencies or the dependencies specified in lock or manifest files. As indicated above, such "non-approved" dependencies may not be as reliable as the approved dependencies whose reliability and integrity have been verified by leveraging the continuous building, testing, delivery, and deployment power of a CI/CD platform.

Figure 1:
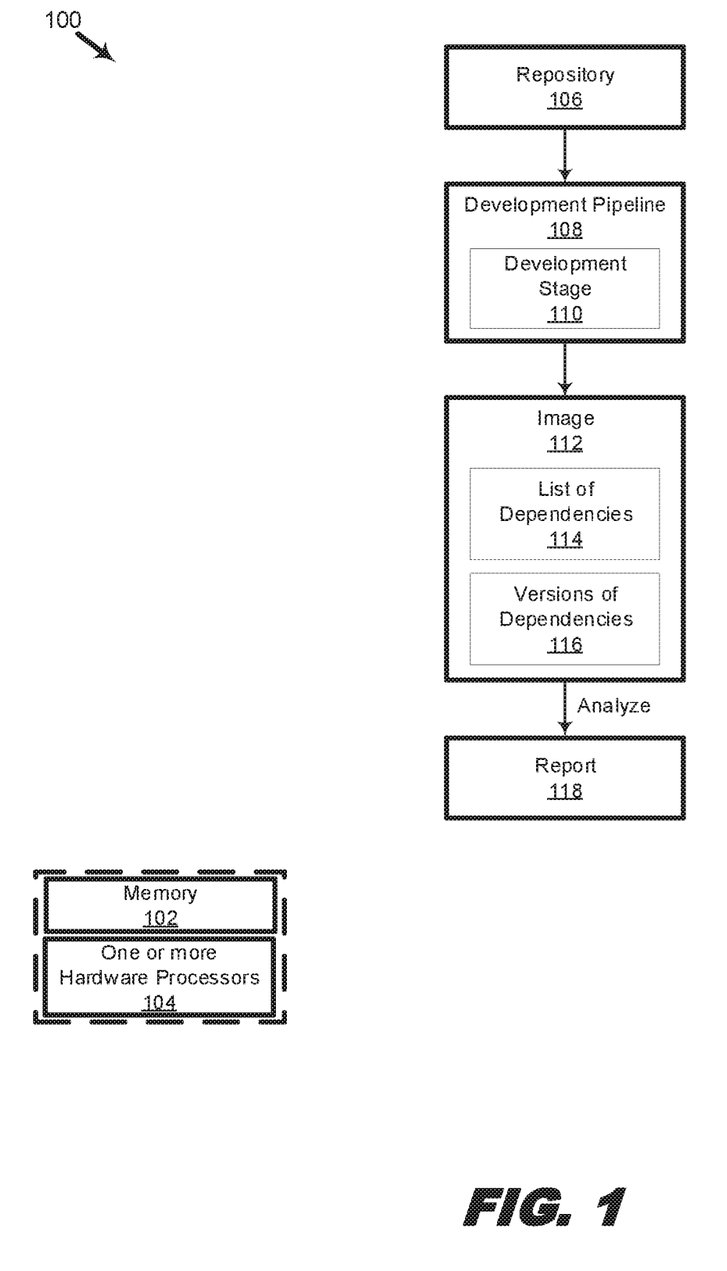
FIG. 1 is an organizational diagram illustrating a system for analyzing an image for vulnerabilities based on the dependencies used in building the image.

FIG. 1 is an organizational diagram illustrating a system 100 for analyzing an image 112 for vulnerabilities based on the dependencies used in building the image 112, in accordance with various examples of the present disclosure. The system 100 includes a non-transitory memory 102 and one or more hardware processors 104 coupled to the non-transitory memory 102. In the present example, the one or more hardware processors 104 executes instructions from the non-transitory memory 102 to perform operations for: providing a repository 106 to a development stage 110 of a development pipeline 108; building an image 112 associated with the repository 106; identifying a list 114 of dependencies and versions 116 of dependencies used in the building of the image 112; analyzing the image 112 for vulnerabilities based on the identified list 114 of dependencies and the versions 116 of the dependencies used in the building of the image 112; and providing a report 118 based on the analysis.

Each of the one or more hardware processors 104 is structured to include one or more general-purpose processing devices such as a microprocessor, central processing unit (CPU), and the like. More particularly, a processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, each processor is structured to include one or more special-purpose processing devices such as an application specific integrated circuit (ASIC), a field programmable gate array (FPGA), a digital signal processor (DSP), network processor, and so forth. The one or more processors execute instructions for performing the operations, steps, and actions discussed herein.

A non-transitory memory 102 is structured to include at least one non-transitory machine-readable medium on which is stored one or more sets of instructions (e.g., software) including any one or more of the methodologies or functions described herein. The non-transitory memory may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read). Accordingly, any of the operations, steps, and actions of the methods described herein may be implemented using corresponding machine-readable instructions stored on or in a memory that are executable by a processor.

The system 100 includes a bus or other communication mechanism for communicating information data, signals, and information between the non-transitory memory 102, the one or more hardware processors 104, and the various components of system 100. For example, the various components may include a data storage device, which may be local to the system 100 or communicatively coupled to the system 100 via a network interface. Components may further include input/output components such as a keyboard, mouse, touch interface, and/or camera that process(es) user actions such as key presses, clicks, taps, and/or gestures and sends a corresponding signal to the bus or other communication mechanism. The I/O component may also include an output component such as a display.

In some examples, a user may use the I/O component to command the system 100, via a user interface such as a graphical user interface, a command line interface, or any other interfaces a user may use to communicate with system 100, to push, upload, transfer, send, communicate, link, or otherwise provide a repository 106 to system 100. The system 100 may include a software development platform, such as RED HAT OPENSHIFT, and a software development pipeline 108, such as JENKINS. In some examples, the software development platform includes the software development pipeline 108. In other examples, the software development platform is separate from the software development pipeline 108. In some the examples, the repository 106 may be provided to one or both of the software development platform and the software development pipeline 108.

The repository 106 may include one or more files, software packages, or other forms of electronic data. In some examples a user registers a repository 106 by providing to the software development platform a link to the repository 106. In some examples, the user may automatically or may additionally subscribe to receive alerts from the software development platform regarding the repository 106. For example, a user may be alerted: if the repository 106 has been updated or modified; if a new image is being built from the repository 106; if an image that has been built from the repository 106 has advanced or regressed to a different development stage; if security vulnerabilities have been detected in the repository 106; etc. Additionally, the software development platform may be provided with multiple repositories 106, in which case the software development platform may provide a management system or management overview of several different projects involving several different repositories each of which may be in different development stages 110.

The development stage 110 may be any one or more of a software development stage. For example, the development stage 110 may be a build stage, a test stage, a merge stage, a release to repository stage, a deployment to production stage, etc. The progress of each project may be monitored and organized according to the nomenclature used by the software development pipeline 108 to describe the development stage 110, and the same development pipeline 108 may be used for each project. Advantageously, doing so would provide a consistent feel and outlook throughout the software development platform. Alternatively, different types of development pipelines 108 may be employed that may be more particularly suitable for the type of project at hand.

Based on the repository 106 provided to the software development platform or the development pipeline 108, an image 112 of an application is created. In some examples, such as where the repository 106 is provided by the user to the software development platform, the software development platform may in turn automatically provide the repository 106 to the development pipeline 108. In other examples, the repository 106 may be directly provided by the user to the development pipeline 108. In either case, the development pipeline 108 may place the image 112 in an appropriate development stage 110. For example, a build stage of the image 112 may be triggered when the development pipeline 108 detects that a developer has checked in new code to a source control server. In some examples, a new branch may be created in which the new code is to be implemented so as not to affect the master branch of the source code. The developer may execute a build process to implement the new code in the new branch.

Then, in a testing stage of the development stage 110, the code may be tested using static tests, unit tests, acceptance tests, integration tests, and other types of testing in a non-production environment. If the code passes testing, the new code may be committed to the repository 106 and become subject to approval for merging into a main branch. In some examples, a lead developer may perform a code review of the change before approving the merge into the master branch. This may be known as a merging stage of the development stage 110. In some examples, the merging also triggers a build and deployment process into a pre-production or production stage of the development stage 110. However, in other examples, such as where continuous integration and continuous delivery principles are practiced, the testing and release to the repository may be automated, i.e., there is no human gatekeeper and automated testing is relied upon for release to repository 106. Further, continuous deployment may extend continuous delivery, which automates the release of a production-ready build to a code repository 106, to also automate releasing an application to production. Thus, in continuous deployment also, there is no human gatekeeper at the stage of the pipeline before production, which means that continuous deployment heavily relies on well-designed test automation.

During a development stage 110 of the image 112, such as during a build stage, a list 114 of dependencies and the versions 116 of the dependencies used to build the application is retrieved. In some examples, such as where the application is built in a container environment, building the application may include building a container image 112 of the application. As described above, the list 114 and versions 116 of the dependencies may be obtained from the install commands or other commands used to build the application, where the commands specify the dependencies to be used in building the application, which may additionally include arguments to specify particular versions 116 of the dependencies to be used as well. In some examples, such as where the application is built from one or more packages, the commands used to build the application may include package manager install commands, such as npm install or mvn install. As described earlier, by directly ascertaining the version of the dependencies used in the build during the build stage, the development pipeline 108 (such as a CI/CD pipeline described above) may be leveraged to resolve exact versions of the dependencies used in the build, and to generate dependency trees of the actual dependencies used in the build without having to rely on a lock or manifest file.

Based on the list 114 and the versions 116 of the dependencies, the image 112 may be analyzed for vulnerabilities, for example, security vulnerabilities. In some examples, the list 114 and the versions 116 of the dependencies are provided to an analytics platform which contains a database storing dependency vulnerability information. As described earlier, the database may be a graph database. The analytics platform compares the list 114 and the versions 116 of the dependencies with the vulnerability database to determine if the dependencies used in the building of the image share one or more properties in common with the corresponding dependencies in the database. For example, the identifier, version numbers, family, relationship information, etc., of the dependencies used in the building of the image may be analyzed against the dependencies in the database.

A report 118 explaining the outcome of the analysis may be provided, which may indicate, for example, that security vulnerabilities have or have not been detected in the list 114 and versions 116 of the dependencies used in building the package. Based on a positive outcome of the analysis, a developer may decide to proceed with building the package using the list 114 and versions 116 of the dependencies. If the outcome were instead negative, a developer may decide to modify the list 114 and versions 116 of the dependencies used in the building of the package, for example, by using dependencies that had previously been analyzed and approved for deployment to production. In some examples, the outcome is fed back to the CI/CD pipeline, which in the spirit of maximal automation automatically modifies the build commands, such as the install command, with a modified list 114 and versions 116 of the dependencies to be used to build a vulnerability-free version of the image 112.

Figure 2:
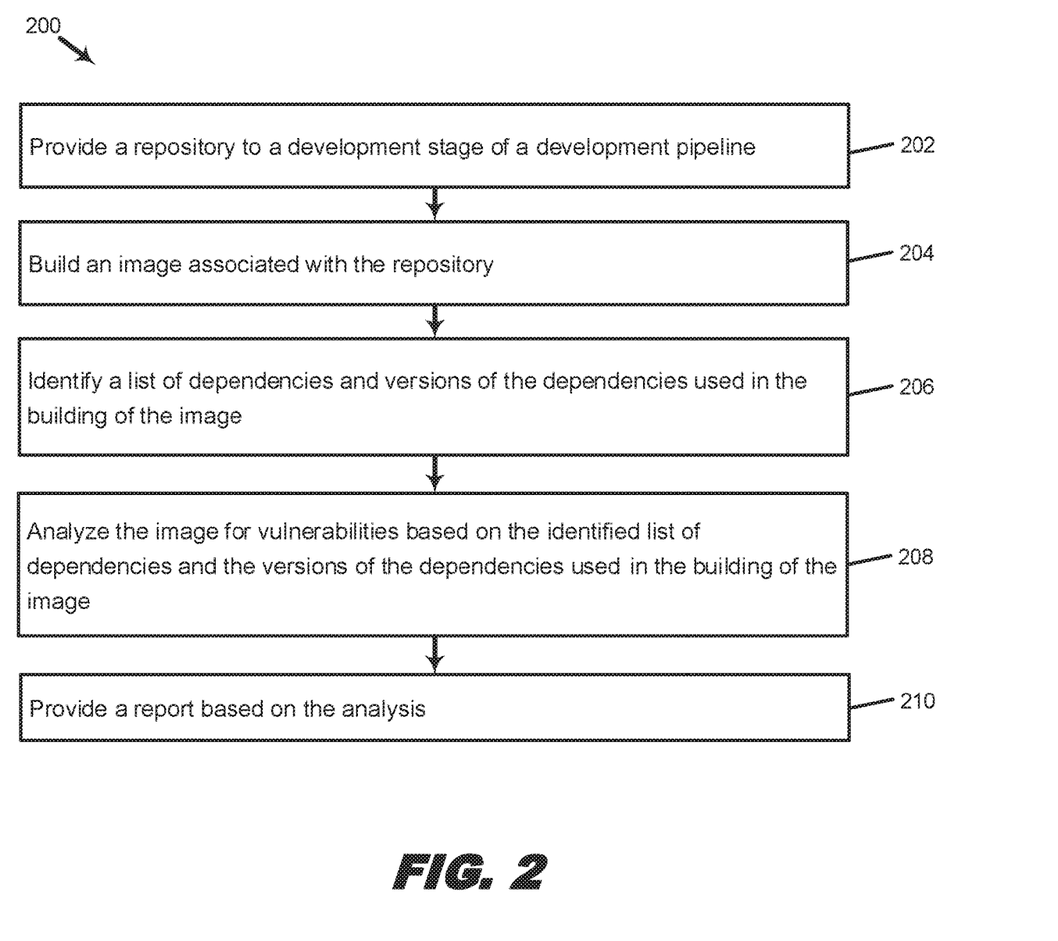
FIG. 2 is a flow diagram illustrating a method for analyzing an image for vulnerabilities based on the dependencies used in building the image.

FIG. 2 is a flow diagram illustrating a method for analyzing an image for vulnerabilities based on the dependencies used in building the image. The method 200 may be performed by non-transitory memory and processors. The non-transitory memory and processors may be provided, for example, by the system 100 described with respect to FIG. 1. Additional steps may be provided before, during, and after the steps of method 200, and some of the steps described may be replaced, eliminated and/or re-ordered for other examples of the method 200. For example, prior to the steps of method 200, a user may register a repository to a software development platform and subscribe to a security alert service to receive security alerts relating to the dependencies and other files contained in the repository. Method 200 may also include additional steps and elements, such as those described with respect to FIGS. 3 and 4. In some examples, method 200 may be performed by one or more computer systems 100 described with respect to FIG. 1, acting in concert or individually.

At action 202, a repository is provided to a development stage of a development pipeline. The repository may contain files that may be packaged into a container image by a package manager, including application code and dependencies to support the application. The development stage may be any one of the stages in a software development pipeline such as a CI/CD pipeline. For example, the development stage may include one or more of a build stage, a test stage, a merge stage, a release to repository stage, a deployment to production stage, etc.

At action 204, an image associated with the repository is built. The build may include installation of packages, and such installation may include specifying the dependencies to be used to build the package. In some examples, the specific version numbers of the dependencies is provided. In some examples, the version numbers are formatted as semantic versions following a three part nomenclature, where the first number indicates major revisions (e.g., breaking changes incompatible with prior versions), a second number indicates minor revisions (e.g., new features that are also backwards compatible), and patches (e.g., backwards-compatible bug fixes). As described above with respect to FIG. 1, closely related to building an image is testing the image. In some examples, building the image also includes testing the image. In some examples, such as in CI/CD pipelines, the testing is automated.

At action 206, the list of dependencies and the versions of the dependencies used in building the image is identified. In some examples, the list and versions are determined from the build command itself, such as an install command. As described earlier, the development pipeline may be leveraged to automatically install missing dependencies and to determine the versions of dependencies where no specific version number is provided in the build command. However, in some examples, versions of the dependencies provided by the user may be ignored, and instead the versions of the dependencies that have been approved (e.g., by a senior developer or automatically by the development pipeline) for deployment to production or that have already been used in production may be automatically used in the building of the image. Such overriding of user-provided dependencies may be performed prior to and thereby obviate analyzing the dependencies against a dependency vulnerability database.

Thus, a user may set appropriate policies to cause the development pipeline to abide by some, all, or none of the user-provided dependencies. For example, if the install command included the argument "latest" to cause a most recent version of the dependency to be used (e.g., v.2.0.0), a policy to override such an argument with the production version of the dependency may instead cause an earlier version to be used (e.g., v. 1.5.0).

In some examples, in addition to the dependencies that have been approved for deployment to production or that have already been used in production, the closest dependencies from an approved list in a security vulnerability database may be automatically used in the building of the image, such as when no corresponding dependencies have been approved for deployment to production or have been used in production. The closest dependencies may be an earlier or later version of the dependency, and priority may be given to versions that most closely match the major version number, followed by the minor version number, and lastly the patch version number.

At action 208, the image may be analyzed based on the list and versions of the dependencies from action 206. As explained above, under certain policies, this action may be obviated. However, where such overriding policies do not apply, then the dependencies used in the building of the image may be analyzed against a security vulnerability database. Under one such policy, the dependencies used in the building of the image are first analyzed against a security vulnerability database to determine if they are included in a safe or approved list, or absent from an unsafe or unapproved list. If so, build the image with the dependencies. If not, apply the dependency (and version number) that has already been used in a production version of the application or image, or, alternatively, apply the dependency (and version number) approved for use in a production version of the application or image, or alternatively, apply the dependency (and version number) approved for use in a pre-production version of the application or image.

At action 210, a report is provided based on the analysis. The report may include the outcome of the analysis (e.g., vulnerabilities detected). Additionally, the report may indicate whether any overriding policies were applied, whether the user's versions were overridden, which of the user's versions were overridden, what versions were applied instead to the build, where the versions came from, and so forth. Based on the report, a user may decide to modify the list and versions of the dependencies used in the build. In some examples, after analysis is completed, feedback is automatically provided to the development pipeline, the software development platform, to the package manager, etc., so as to modify the build command with the approved dependencies or versions of the dependencies instead of those originally provided in the user's build command.

Figure 3:
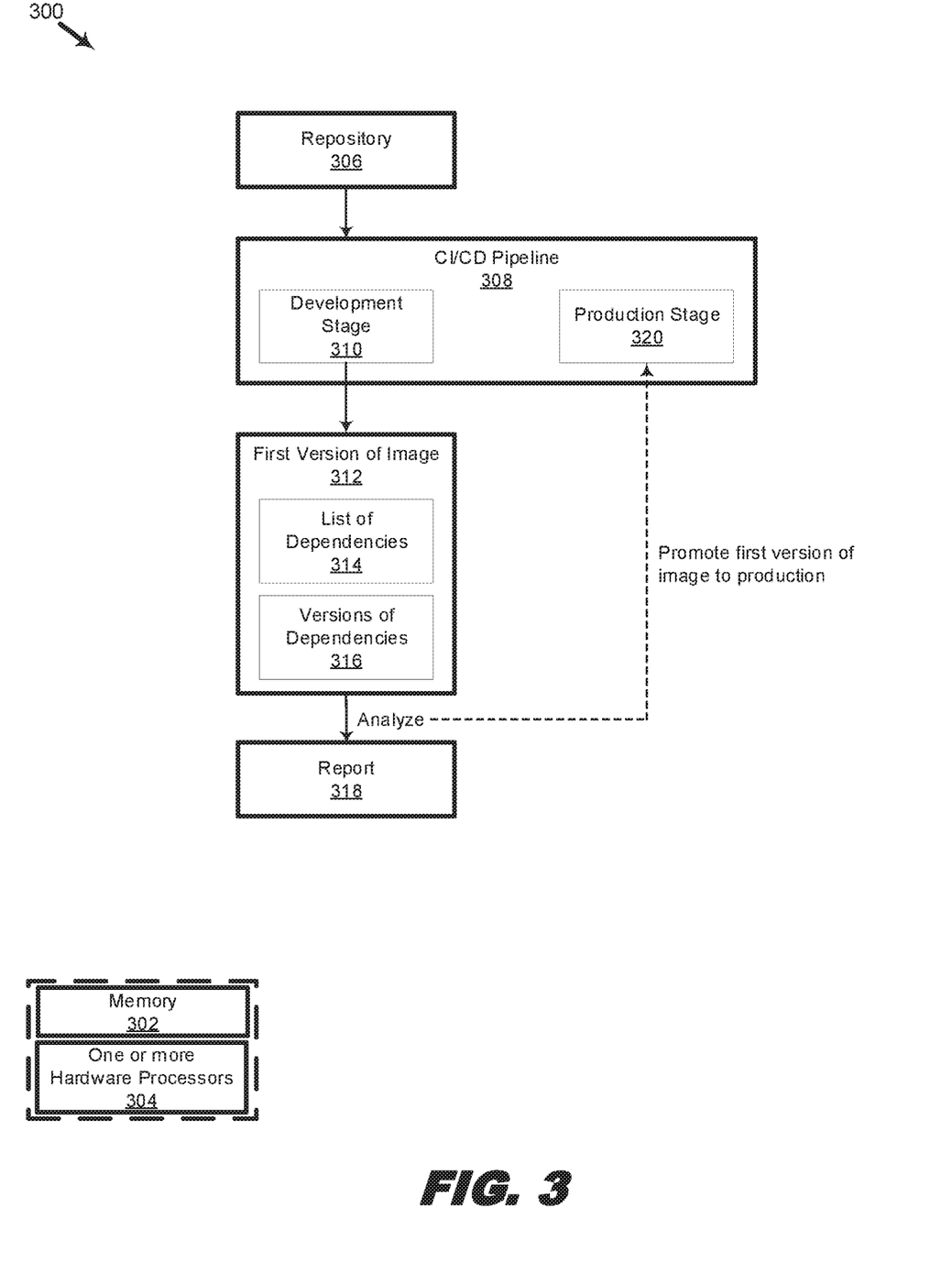
FIG. 3 is an organizational diagram illustrating a system for analyzing a first version of an image for vulnerabilities based on the dependencies used in building the first version of the image, and promoting the first version of the image to a production stage of a CI/CD pipeline.

FIG. 3 is an organizational diagram illustrating a system 300 for analyzing a first version of an image 312 for vulnerabilities based on the dependencies used in building the first version of the image 312, and promoting the first version of the image 312 to a production stage 320 of a CI/CD pipeline 308, in accordance with various examples of the present disclosure. The system 300 includes a non-transitory memory 302 and one or more hardware processors 304 coupled to the non-transitory memory 302, which are similar to those described with respect to FIG. 1. In the present example, the one or more hardware processors 304 executes instructions from the non-transitory memory 302 to perform operations for: providing a repository 306 to a development stage 310 of a CI/CD pipeline 308; building a first version of an image 312 associated with the repository 306; identifying a list 314 of dependencies and versions 316 of dependencies used in the building of the first version of the image 312; analyzing the first version of the image 312 for vulnerabilities based on the identified list 314 of dependencies and the versions 316 of the dependencies used in the building of the image 312; providing a report 318 based on the analysis; and promoting the first version of the image 312 to a production stage 320 of the CI/CD pipeline 308.

In the interest of brevity, only the salient differences between system 300 and system 100 will be described in detail. A first difference is that system 300 includes a particular kind of development pipeline, i.e., a CI/CD pipeline, rather than a general development pipeline 108 described with respect to FIG. 1. As earlier described, a CI/CD pipeline 308 may be leveraged to accurately obtain the list 314 and versions 316 of dependencies used in building the first version of the image 312 without consulting a lock file or manifest file.

Additionally, FIG. 3 illustrates the promotion of a first version of the image 312 to a production stage 320 of the CI/CD pipeline 308 after analyzing the first version of the image 312 for security vulnerabilities based on the list 314 and versions 316 of the dependencies used in the building of the first version of the image 312. In some examples, based on the analysis, a flag is set to indicate whether security vulnerabilities have been detected by the analytics platform. If the flag indicates that security vulnerabilities have been detected, then the CI/CD pipeline 308 will be prevented from automatically performing one or more of the following: locally committing a change to a branch; committing the change to a master branch or to the repository 306; merging the branch with the master branch; releasing the change to the repository 306; and deploying the change to pre-production or production. The flag may be cleared by a developer having sufficient authority, which may be a more senior developer than the developer implementing the change.

However, if the flag indicates that no security vulnerabilities have been detected, or if the flag is cleared, then the CI/CD pipeline 308 may proceed with the usual process of automatically deploying or promoting the first version of the image 312 to the production stage 320 (assuming that all other testing is also passed). FIG. 3 shows an example where the first version of the image 312 contains no security vulnerabilities, passes all testing, and has been promoted to the production stage 320.

Figure 4:
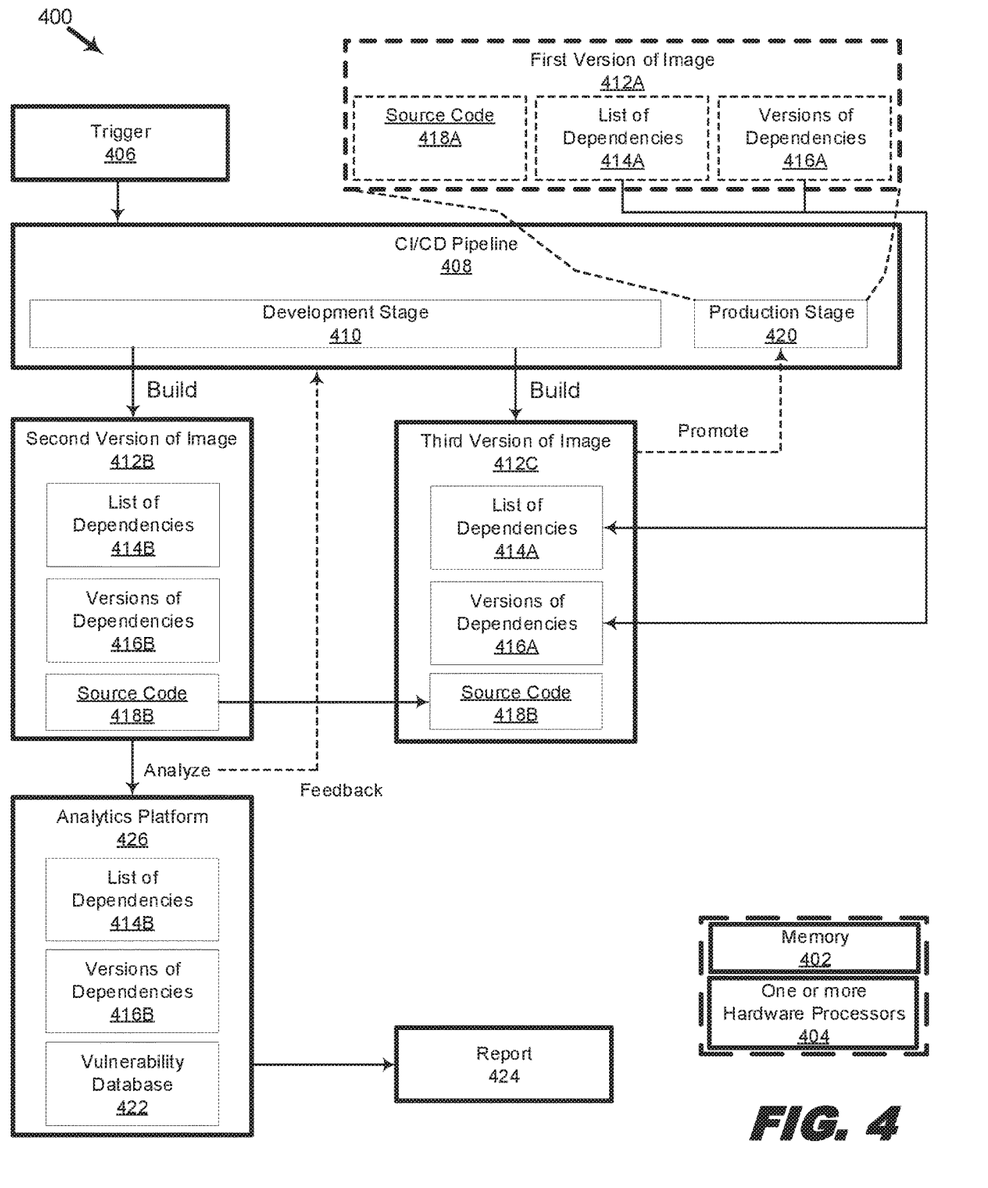
FIG. 4 is an organizational diagram illustrating a system for analyzing a second version of an image for vulnerabilities based on the dependencies used in building the second version of the image, and building a third version of the image using a list of dependencies and versions of the dependencies from a first version of the image that is in a production stage of a CI/CD pipeline, using source code from the second version of the image.

FIG. 4 is an organizational diagram illustrating a system 400 for analyzing a second version of an image 412B for vulnerabilities based on the dependencies used in building the second version of the image 412B, and building a third version of the image 412C using a list 414A of dependencies and versions 416A of the dependencies from a first version of the image 412A that is in a production stage 418 of a CI/CD pipeline 408, using source code 418B from the second version of the image 412B, in accordance with various examples of the present disclosure. The system 400 includes a non-transitory memory 402 and one or more hardware processors 404 coupled to the non-transitory memory 402, which are similar to those described with respect to FIG. 1. In the present example, the one or more hardware processors 404 executes instructions from the non-transitory memory 402 to perform operations for: receiving a trigger 406; in response to receiving the trigger 406, entering a development stage 410 of CI/CD pipeline 408 to build a second version of an image 412B; identifying a list 414B of dependencies and versions 416B of the dependencies used in the building of the second version of the image 412B; receiving source code 418B associated with the second version of the image 412B; analyzing the second version of the image 412B for vulnerabilities based on the identified list 414B of dependencies and the versions 416B of the dependencies used in the building of the image 312 against a vulnerability database 422; providing a report 424 based on the analysis; providing feedback to the CI/CD pipeline 408; building a third version of the image 412C from a list 414A and 416A of dependencies from a first version of the image 412A in a production stage 420 of the CI/CD pipeline 408 and the source code 418B associated with the second version of the image 412B.

Recall from FIG. 3 that the first version of the image 412A has been deployed to production, i.e., has entered production stage 420. In FIG. 4, a trigger 406 is received which causes the CI/CD pipeline 408 to automatically build a second version of the image 412B. For example, a developer may have added new features to the source code or otherwise modified the source code 418A of the first version of the image 412A, thus giving rise to a second version of the image 412B based on the new or modified source code 418B. Therefore, in some examples, the source code 418B may be similar to, or is a variant of, source code 418A. However, source code 418B may also be different from source code 418A. When a developer checks in changes, for example, to a new branch of a project managed on the software development platform or the CI/CD pipeline, the CI/CD pipeline may detect the newly checked-in source code 418B.

The source code 418B or a modified portion thereof may then undergo testing, which may be automated by the CI/CD pipeline 408, to detect bugs and other errors in the source code 418B. After successful testing, the second version of the image 412B may then be built. In some examples, the second version of the image 412B is built using source code 418B and the same list 414A and versions 416A of dependencies as the first version of the image 412A. However, in other examples, the second version of the image 412B is built using source code 418B and a different list 414B and versions 416B of dependencies as the first version of the image 412A.

In examples where the second version of the image 412B is built using the same list 414A and versions 416A of dependencies as the first version of the image 412A, no further analysis of the dependencies may need to be performed since the dependencies have already been used in a production stage 420. This is because, presumably, dependencies used in the production stage 420 have already been verified as free of security vulnerabilities. However, as attackers constantly find new ways to exploit software, even previously trusted dependencies may become subject to new security vulnerabilities. Thus, in some examples, even if the second version of the image 412B uses the same the list 414A and versions 416A of the dependencies as the first version of the image 412A, the dependencies may still be analyzed by analytics platform 426 for vulnerabilities. Needless to say, if the second version of the image 412B uses a different list 414B or versions 416B of dependencies as the first version of the image 412A, the different dependencies may also be analyzed by analytics platform 426 for vulnerabilities.

The analytics platform 426 may compare the lists 414A or 414B and versions 416A or 416B of the dependencies, as the case may be, against corresponding dependencies in a vulnerability database 422. The vulnerability database 422 may be an internal database developed by the operators of the software development platform or the CI/CD pipeline 408 or an external database developed by trusted external developers such as developers of antivirus or anti-malware software. The vulnerability database 422 may include a safe list of dependencies that have been verified as vulnerability-free, and an unsafe list of dependencies that are known to contain vulnerabilities. The analytics platform 426 may periodically update the vulnerability database 422, for example, by synchronizing its vulnerability database 422 with external databases. In some examples, updates to the vulnerability database 422 are effected by periodically pulling data from data sources. In other examples, updates are pushed to the vulnerability database 422 by the data sources.

As previously described, the results of the analysis may be published in a report 424. The report 424 may indicate whether or not security vulnerabilities were detected in the lists 414A or 414B and versions 416A or 416B of the dependencies used in the building of the second version of the image 412B. The report 424 may also indicate, if vulnerabilities were detected, what actions, if any, were taken or are recommended to be taken to address the vulnerabilities. For example, if vulnerabilities were detected with respect to a later version of a dependency, but an earlier version of the same dependency did not contain the vulnerability, a recommended action may be to use the earlier version instead of the later version. Similarly, if vulnerabilities were detected with respect to an earlier version of a dependency, but a later version of the same dependency does not contain the vulnerability, a recommended action may be to use the later version instead of the earlier version. As another example, if vulnerabilities are associated with a particular source of dependencies (e.g., if the source has been compromised by hackers), then the recommended action may be to use dependencies from alternative sources verified to be safe.

The results of the analysis may be fed back to the software development platform or the CI/CD pipeline 408. As a result of the analysis, a third version of the image 412C may be built using at least the list 414A and versions 416A of dependencies from the first version of the image 412A in the production stage 420 of the CI/CD pipeline 408, and source code 418B from the second version of the image 412B. For example, such a third version of the image 412C may be so built if the analysis indicated that vulnerabilities were detected in the list 414B or versions 416B of the dependencies in the building of the second version of the image 412B. In some examples, upon detecting vulnerabilities, the build of the second version of the image 412B is interrupted and the third version of the image 412C is built instead.

If the source code 418B also requires other dependencies that are not in the list 414A and versions 416A of the dependencies from the first version of the image 412A, the CI/CD pipeline 408 may determine what the other required dependencies are and retrieve a closest-matched version of the dependencies that have been verified as safe or not unsafe by the vulnerability database 422. For example, the software development platform or the CI/CD pipeline 408 may compare the list 414A of the dependencies required by the first version of the image 412A against the list 414B of the dependencies required by the second version of the image 412B, and find that some dependencies in the list 414B are not included in the list 414A. Accordingly, the software development platform or the CI/CD pipeline 408 may then retrieve those additionally required dependencies after consulting with the vulnerability database 422. For example, if the build command contains an argument to use the latest version of a dependency, then the latest version of the dependency that has been verified as safe or not unsafe in the vulnerability database 422 may be used. In some examples, the latest version that has been verified as safe or not unsafe is too many versions behind, in which case a developer may be alerted to the fact and the build paused. How many versions is "too many" versions behind, in other words, the acceptable version distance of a closest version, is a parameter that is configurable, e.g., within 1 major revision, within 3 minor revisions, or within 4 patches, etc. Likewise, if the build commands contains an argument to use a particular version, say version 4.1.2, but the closest version in the vulnerability database that has been verified as safe or not unsafe is too far from the specified version, then the developer may also be alerted to the fact and the build paused. If however, multiple versions are found that are within the acceptable version distance, priority may be given to the latest version.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A system comprising:
   a non-transitory memory; and
   one or more hardware processors coupled to the non-transitory memory to execute instructions from the non-transitory memory to perform operations comprising:
   providing a repository to a development stage of a development pipeline;
   building an image associated with the repository;
   identifying a list of dependencies and versions of the dependencies used in the building of the image;
   determining whether one or more portions of the image utilizes dependencies verified as free of a security vulnerability in a prior version of the image, wherein the security vulnerability corresponds to an aspect of the image which may be exploited;
   responsive to identifying at least one portion of the image that utilizes a dependency verified as being free of the security vulnerability, skipping an analysis of the at least one portion of the image;
   analyzing a remaining portion of the image for the security vulnerability based on the identified list of dependencies and the versions of the dependencies used in the building of the image;
   determining whether one or more portions of the image utilizes dependencies unverified as free of the security vulnerability;
   responsive to identifying at least one portion of the image that utilizes a dependency unverified as being free of the security vulnerability, retrieving a closest-match version of the dependency unverified as being free of the security vulnerability that has been verified as free of the security vulnerability; and
   providing a report based on the analyzing.

2. The system of claim 1, wherein the building includes building a first version of an image associated with the repository.

3. The system of claim 2, wherein the identifying includes identifying a list of dependencies and versions of the dependencies used in the building of the first version of the image.

4. The system of claim 3, further comprising promoting the first version of the image to a production stage of the development pipeline.

5. The system of claim 4, further comprising building a second version of the image, wherein one or more dependencies used in the building of the second version of the image differs from the dependencies used in the building of the first version of the image.

6. The system of claim 5, wherein the analyzing includes analyzing the second version of the image for the security vulnerability based on the list of dependencies and the versions of the dependencies used in the building of the first version of the image.

7. The system of claim 4, wherein the development pipeline is a continuous integration/continuous development (CI/CD) pipeline.

8. The system of claim 1, wherein the list of dependencies and version of dependencies used in the building of the image is not obtained from a manifest lock file.

9. The system of claim 5, wherein the building of the second version of the image is triggered by the development pipeline.

10. The system of claim 9, wherein the trigger includes detecting a change in the list of dependencies and the versions of the dependencies used in the building of the first version of the image.

11. The system of claim 4, wherein control is exerted over a number of privileges to promote the first version of the image to the production stage.

12. The system of claim 11, wherein a fewer number of the privileges to promote the image to the production stage exist than a number of privileges to commit the image to a build stage of the development pipeline.

13. The system of claim 1, wherein the dependencies include direct and transitive dependencies.

14. The system of claim 1, wherein the analyzing includes comparing data associated with one or more dependencies in the list of dependencies against data associated with corresponding dependencies in a data structure that includes vulnerability data.

15. The system of claim 5, wherein the second version of the image differs from the first version of the image in ways other than the dependencies used to build the second version of the image and the first version of the image.

16. The system of claim 11, further comprising building a third version of the image when the report is positive, wherein the third version of the image uses the code in a second version of the image and at least the dependencies used to build the first version of the image.

17. A method comprising:
    providing a repository to a development stage of a development pipeline;
    building an image associated with the repository;
    identifying a list of dependencies and versions of the dependencies used in the building of the image;
    determining whether one or more portions of the image utilizes dependencies verified as free of a security vulnerability in a prior version of the image, wherein the security vulnerability corresponds to an aspect of the image which may be exploited;

responsive to identifying at least one portion of the image that utilizes a dependency verified as being free of the security vulnerability, skipping an analysis of the at least one portion of the image;

analyzing a remaining portion of the image for the security vulnerability based on the identified list of dependencies and the versions of the dependencies used in the building of the image;

determining whether one or more portions of the image utilizes dependencies unverified as free of the security vulnerability responsive to identifying at least one portion of the image that utilizes a dependency unverified as being free of the security vulnerability, retrieving a closest-match version of the dependency unverified as being free of the security vulnerability that has been verified as free of the security vulnerability; and providing a report based on the analyzing.

18. A non-transitory machine-readable medium having stored thereon machine-readable instructions executable to cause at least one machine to perform operations comprising:

building an image associated with a repository;

identifying a list of dependencies and versions of the dependencies used in the building of the image;

determining whether one or more portions of the image utilizes dependencies verified as free of a security vulnerability in a prior version of the image, wherein the security vulnerability corresponds to an aspect of the image which may be exploited;

responsive to identifying at least one portion of the image that utilizes a dependency verified as being free of the security vulnerability, skipping an analysis of the at least one portion of the image;

analyzing a remaining portion of the image for the security vulnerability based on the identified list of dependencies and the versions of the dependencies used in the building of the image;

determining whether one or more portions of the image utilizes dependencies unverified as free of the security vulnerability;

responsive to identifying at least one portion of the image that utilizes a dependency unverified as being free of the security vulnerability, retrieving a closest-match version of the dependency unverified as being free of the security vulnerability that has been verified as free of the security vulnerability; and providing a report based on the analyzing.

19. The non-transitory machine-readable medium of claim 18, wherein the list of dependencies and versions of the dependencies are identified from a build command and not from a manifest lock file.

* * * * *